March 26, 1968
R. I. SATTLER
3,374,710
MACHINE TOOL VIBRATION DAMPENER
Filed Jan. 3, 1966
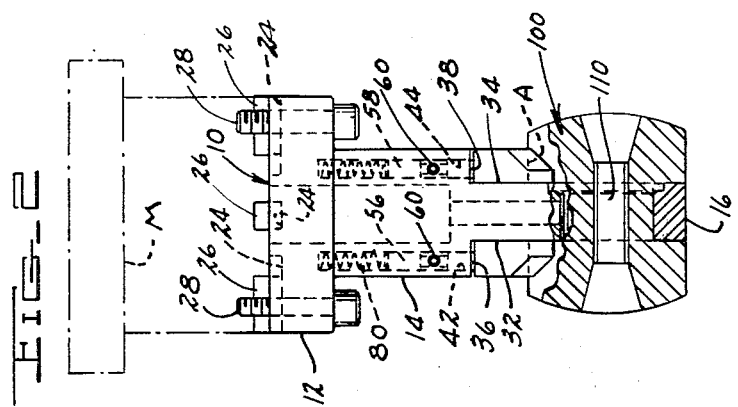
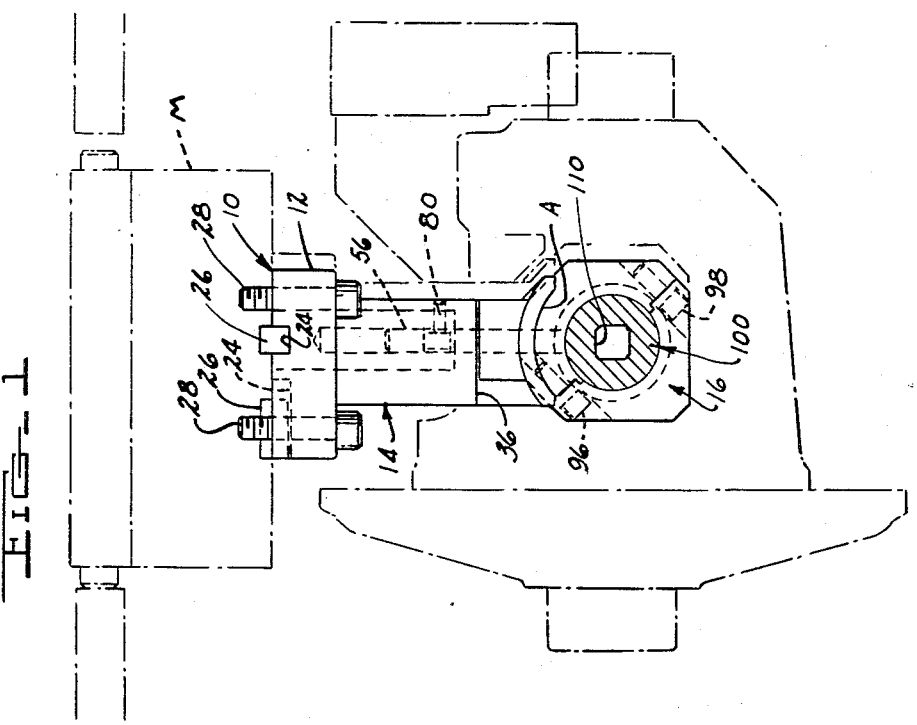
INVENTOR
ROBERT IRWIN SATTLER
BY ROBERT H. ELLIOTT

United States Patent Office 3,374,710
Patented Mar. 26, 1968

3,374,710
MACHINE TOOL VIBRATION DAMPENER
Robert Irwin Sattler, St. Clair Shores, Mich., assignor to
La Salle Machine Tool, Inc., Warren, Mich.
Filed Jan. 3, 1966, Ser. No. 518,201
7 Claims. (Cl. 90—11)

The present invention relates to new and useful improvements in machine tools and particularly to a vibration dampening machine tool.

Tool marks as a result of chatter in the machine tool business has posed many problems throughout the years, and the scrap parts which result therefrom has been very costly. It is to a reduction of such scrap that this invention is directed.

It is therefore a primary object of the present invention to provide a vibration dampening machine tool which will substantially reduce, if not eliminate chatter between the cutting tool and workpiece when a cutting operation occurs.

Another object of the invention is the provision of vibration dampening cutting tool which is simple, durable and relatively inexpensive to manufacture.

Still another object of the invention is the provision of a cutting tool which is resiliently mounted and driven from an external source.

Another object of the present invention is the provision of a vibration dampening cutting tool wherein the central portion thereof is formed to receive a keyed driver from either end thereof.

Yet still another object of the invention is the provision of a cutting tool which is double ended and pre-loaded on the outer surface thereof to prevent vibration.

Another object of the invention is the provision of a pre-loaded member which has an arcuate end thereon so as to engage a larger portion of the outer surface of the cutting tool.

The above and other objects of the present invention can be accomplished by the provision of a generally symmetrical two part support member; a substantially flat base on said support member for mounting said base portion thereof to a machine; the opposite end of said support member having a cap secured thereto, the central portion of said support member and said cap having a semi-circular portion cut therefrom and positioned in alignment with each other by means of a key disposed on the engaging surfaces of said cap with said support member; a pair of aligned openings located in parallel relationship, perpendicular to the rotational axis of said semi-circular portion; each of said openings to receive a spring member therein, followed by an undercut stem of generally symmetrical configuration which carries a tool loading member of arcuate shape on the end thereof; means in said support member for retaining said tool loading members; a double ended cutting tool rotatably positioned within said semi-circular portions of said support member and said cap member and against the arcuate portions of said tool loading members, said cap member retained on said support member by means of screws; the double ended cutting tool having the central portions thereof on each end cut away to receive one end of an external rotary drive member therein; rotation of said cutting tool and displacement thereof into a workpiece in either direction results in a vibrationless cutting action as a result of the engagement of the flanged portions of the cutting tool with the support member and the arcuate portions of the tool loading members with the outside surface of said cutting tool.

Other objects of this invention will appear in the following description and appended claims, reference being had to the accompanying drawings which form a part of this specification, wherein like reference characters designate corresponding parts in the several views.

In the drawings:

FIGURE 1 illustrates a cutting tool which embodies the present invention, with a workpiece and tool mounting means being shown in phantom.

FIGURE 2 is a side view of FIGURE 1 with the phantom workpiece removed.

Before explaining the present invention in detail, it is to be understood that the invention herein is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Looking now at the drawings, it will be noted that the tool of the present invention is identified by the numeral 10. The tool 10 has a base portion 12, a body portion 14 and a cap member 16. The base portion 12 has a generally flat surface 22 thereon, which has a plurality of cut away portions 24 which are adapted to receive key members 26 therein. The key members 26 engage corresponding sections in the machine proper which is shown in phantom and identified by the letter M. The base portion 12 is secured to the machine M by a plurality of threaded members 28.

The body portion 14 of the tool 10 extends from the base portion thereof and is of generally symmetrical configuration. The upper portion of the body 14 is cut away and has two flat sides 32 and 34 which are located in generally parallel spaced relationship. The sides 32 and 34 intersect the body portion 14 at substantially right angles as indicated at 36 and 38. Centrally positioned and at right angles to the surfaces 36 and 38 are two openings 42 and 44 which are adapted to receive the tool loading members 52 and 54.

The tool loading members 52 and 54 are of generally symmetrical configuration. The body portion thereof is of such dimension as to engage the flat surface 32 of the tool support member, when the stem portion thereof is positioned in the opening 42. Since the tool loading members are of the same configuration, the body portion of member 54 will likewise engage the flat surface 34 of the tool support member when the stem portion is positioned in the opening 44. Each of the stem portions 56 and 58 extend at substantially right angles to the body portion thereof, with the central portions thereof being cut away so as to receive a retaining member 60. Therefore, when a compression spring 80 is positioned beneath each of the stem members 56 and 58, the retaining member 60 will limit the travel thereof. The outermost end of each of the tool loading members is arcuate in configuration so as to engage a substantial portion of the outer surface of the cutting tool 100.

The cutting tool is of the double ended variety, with the central portion thereof undercut. The flanged edges of the cutting tool 100 engage the flat surfaces of the support member 32 and 34, while the bearing portion 102 is received in a semi-circular cut out in the end of the tool body 14. A similar semi-circular portion is found in the bearing cap 16. The cap portion is keyed to the body portion 14, which is the means of support for the cutting tool, when the bearing cap 16 is secured with the screws 96 and 98. Therefore, when the cutting tool is rotatably positioned in the tool support proper, the arcuate portions of the tool loading members engage the outer surface of the cutting tool 100.

It will also be noted that the central portion of the cutting tool is hollow and has a keyway 110 therein. A lead is formed on each end thereof to permit entrance of an external driver from either end.

Therefore, it is apparent from the foregoing description that the present invention is simple, durable and inexpensive. Also, because of its inherent preloading of the tool, any resulting chatter which occurs when the tool engages a workpiece will be dampened and tool marks on the finished surfaces thereof will be eliminated. In addition, while a double ended spherical cutter is illustrated, it will also be apparent that any cutter configuration could be used without departing from the spirit of the invention.

Having thus described my invention, I claim:

1. In a vibration dampening machine tool, the combination of,
   a support member;
   a generally flat base on said support member for mounting same;
   a double ended cutting tool rotatably disposed at generally right angles to said support member;
   and at least one pre-loaded member carried by said support member for engagement with said cutting tool so as to eliminate any vibration when said cutting tool is caused to engage a workpiece.

2. A device as in claim 1, wherein said double ended cutting tool is axially displaceable and keyed in the central portion of each end to receive an external rotary drive member.

3. In a vibration dampening machine tool, the combination of,
   a generally symmetrical configuration support member;
   a substantially flat base on said support member for mounting same;
   a double ended cutting tool rotatably secured to the end of said support member, the central portion of said cutting tool being keyed at both ends to receive an external rotary drive member therein;
   a pre-loaded member in engagement with each end of said cutting tool to eliminate any vibration when either end of said cutting tool is moved into engagement with a workpiece.

4. A device as in claim 3, wherein each of said pre-loaded members is mechanically actuated with a spring, while being contained with a mechanical stop member.

5. In a vibration dampening machine tool, the combination of,
   a generally symmetrical, two part support member;
   a substantially flat base on said support member for mounting same;
   the opposite end of said support member having a semi-circular portion cut therefrom;
   a cap member having a semi-circular portion cut therefrom, said cap member and support member being in alignment and held by any suitable means;
   a pair of openings in said support member in perpendicular relationship to the rotational axis of said semi-circular portions;
   each of said openings to receive a spring member therein, as well as the stem portion of a tool loading member;
   a double ended cutting tool positioned in said semi-circular portion of said support member and against each of said tool loading members, while being retained therein with said cap member;
   said double ended cutting tool being keyed at both ends to receive an external rotary drive member therein;
   rotation of said cutting tool and displacement thereof into a workpiece in either direction results in a vibrationless cutting action as a result of the engagement of the tool loading members with said cutting tool.

6. A device as in claim 5, wherein the ends of the tool loading members are arcuate and therefore engage a greater surface area of the cutting tool to further enhance the vibration dampening characteristics of the tool.

7. A device as in claim 5, wherein the engaging surfaces of the cap member and support are angularly displaced with respect to the flat mounting base, while said cap member and support member are keyed together to prevent misalignment.

References Cited
UNITED STATES PATENTS

| | | | |
|---|---|---|---|
| 2,586,157 | 2/1952 | Gasser et al. | 90—11 |
| 3,178,969 | 4/1965 | Yogus et al. | 77—58 |
| 3,242,818 | 3/1966 | Kastler | 90—11 |

GERALD A. DOST, *Primary Examiner.*